United States Patent
Buddemeier et al.

(10) Patent No.: US 8,098,938 B1
(45) Date of Patent: Jan. 17, 2012

(54) SYSTEMS AND METHODS FOR DESCRIPTOR VECTOR COMPUTATION

(75) Inventors: Ulrich Buddemeier, Sebastopol, CA (US); Hartmut Neven, Malibu, CA (US)

(73) Assignee: Google Inc., Mountain View, CA (US)

( * ) Notice: Subject to any disclaimer, the term of this patent is extended or adjusted under 35 U.S.C. 154(b) by 928 days.

(21) Appl. No.: 12/049,841

(22) Filed: Mar. 17, 2008

(51) Int. Cl.
G06K 9/46 (2006.01)
G06K 9/62 (2006.01)
G06T 11/20 (2006.01)

(52) U.S. Cl. ......... 382/207; 382/191; 382/225; 345/441

(58) Field of Classification Search ............... 382/181, 382/191, 225, 207; 345/441
See application file for complete search history.

(56) References Cited

U.S. PATENT DOCUMENTS

| | | | |
|---|---|---|---|
| 5,481,269 A * | 1/1996 | Imhoff et al. | 342/90 |
| 6,580,811 B2 | 6/2003 | Maurer et al. | |
| 6,711,293 B1 | 3/2004 | Lowe | |
| 7,362,887 B2 * | 4/2008 | Oohashi et al. | 382/118 |
| 2004/0071300 A1 * | 4/2004 | Zelazo et al. | 381/106 |
| 2008/0107311 A1 * | 5/2008 | Huang et al. | 382/118 |
| 2009/0185746 A1 * | 7/2009 | Mian et al. | 382/209 |

OTHER PUBLICATIONS

Maurer, T. et al., "Tracking and Learning Graphs on Image Sequences of Faces", Proceedings of International Conference on Artificial Neural Networks at Bochum; Jul. 16, 2006; 6 pages.
Lowe, David G., "Distinctive Image Features from Scale-Invariant Keypoints", International Journal of Computer Vision; Jan. 5, 2004; 28 pages.

* cited by examiner

*Primary Examiner* — Kathleen Y Dulaney
(74) *Attorney, Agent, or Firm* — Sterne, Kessler, Goldstein & Fox P.L.L.C.

(57) ABSTRACT

Systems and methods for descriptor vector computation are described herein. An embodiment includes (a) identifying a plurality of regions in the digital image; (b) normalizing the regions using at least a similarity or affine transform such that the normalized regions have the same orientation and size as a pre-determined reference region; (c) generating one or more wavelets using dimensions of the reference region; (d) generating one or more dot products between each of the one or more wavelets, respectively, and the normalized regions; (e) concatenating amplitudes of the one or more dot products to generate a descriptor vector; and (f) outputting a signal corresponding to the descriptor vector.

11 Claims, 4 Drawing Sheets

SYSTEMS AND METHODS FOR DESCRIPTOR VECTOR COMPUTATION

FIELD OF THE INVENTION

The present invention relates in general to image matching technology.

RELATED ART

Image matching techniques may be used in a variety of applications such as control of industrial processes, detecting events, tracking, object or place recognition and organizing or retrieving image data.

The effectiveness of such image matching techniques may depend on an image matching algorithm that is used by a matching process. An image matching algorithm may utilize a computed parameter such as a descriptor of a digital image for use by the matching process. A descriptor of a digital image, for example, may refer to characteristics of an image. Descriptors may also be local and need not describe an entire image or an object in an image. Descriptors for different images may be compared using a variety of distance metrics to find matching regions in other images.

The performance of any matching process therefore depends on an algorithm that computes a descriptor. Desirable features of a descriptor include sensitivity to appearance of an image as far as it is affected by properties usually specific to an object in an image.

Systems and methods to compute a descriptor are needed that improve performance of an image matching process as compared to present methods.

BRIEF SUMMARY

The present invention relates to systems and methods for computing a descriptor vector of a local region in a digital image using Gabor sampling. A method embodiment includes (a) identifying a plurality of regions in the digital image; (b) normalizing the regions using at least a similarity or affine transform such that the normalized regions have the same orientation and size as a pre-determined reference region; (c) generating one or more wavelets using dimensions of the reference region; (d) generating one or more dot products between each of the one or more wavelets, respectively, and the normalized regions; (e) concatenating amplitudes of the one or more dot products to generate a descriptor vector; and (f) outputting a signal corresponding to the descriptor vector.

A system embodiment includes an interest point detector configured to identify a plurality of regions in a digital image, a wavelet generator configured to generate one or more wavelets, a dot product generator configured to generate one or more dot products between each wavelet respectively, and the regions of the digital image, and a concatenator configured to concatenate amplitudes of the one or more dot products to generate a descriptor vector. In this way, quality of an image matching process may be improved by computing the value of a descriptor vector using an embodiment of the invention.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

The present invention relates to systems and methods for computing a descriptor vector of a region in a digital image using Gabor sampling. A descriptor vector computed using embodiments of this invention may improve the matching performance of an image matching process.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The detailed description of the embodiments of the present invention is divided into several sections as shown by a table of contents that follows.

Table of Contents
I. System
II. Gabor Kernels
III. Compressing and Optimizing Gabor Descriptors
IV. Conclusion

I. System

Figure 1:
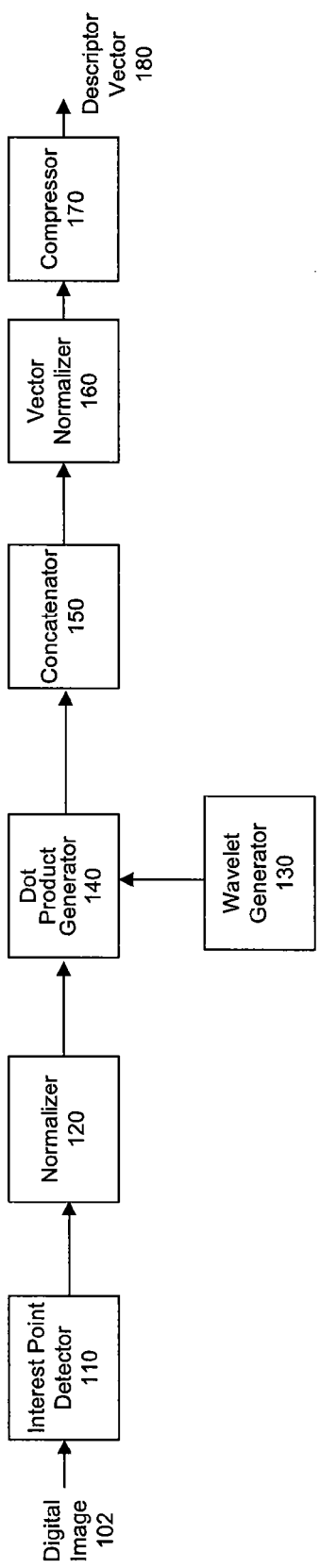
FIG. 1 is a diagram of a system used to compute a descriptor vector according to an embodiment of the invention.

FIG. 1 is a diagram of a system 100 which may be used to compute a descriptor vector in an embodiment of the invention. System 100 includes interest point detector 110, normalizer 120, wavelet generator 130, dot product generator 140, concatenator 150, vector normalizer 160 and compressor 170.

Interest point detector 110 may accept digital image 102 as an input and generate a plurality of local regions of digital image 102 as an output. In an embodiment, the plurality of local regions are regions of interest of digital image 102. As an example, not intended to limit the invention, regions of interest in an image may include portions of digital image 102 that have a well founded shape and are not disturbed by geometric perturbations to digital image 102. Such a generated local region of digital image 102 may be specified by its location r, scale s and an orientation t. In an embodiment, location r is a two dimensional vector, scale s is a positive number and orientation t is a number in the range of 0 to $2\Pi$.

Normalizer 120 normalizes a plurality of regions of a digital image by rotating or resealing a local region of digital image 102 generated by interest point detector 110 to match the wavelets that may be generated by wavelet generator 130. Normalization of a local region of digital image 102 generated by interest point detector 110 may be carried out by using a similarity transform. Such a transform may convert a local region of digital image 102 into a fixed size image region that matches the wavelets in size based on a pre-determined reference region. In an embodiment, the similarity transform is of the form $z = A \cdot x + b$, where x is the two dimensional position of the local image region in input digital image 102, z is the two dimensional position in the normalized local image region, 'A' may be a two dimensional matrix. As an example, not intended to limit the invention, the two dimensional matrix represented by A is of the form, $((a_1 - a_2)(a_2\ a_1))$ 'b' may be a two dimensional vector. As an example, not intended to limit the invention, the two dimensional vector represented by b, is of the form, $(b_1\ b_2)$ In an embodiment, the parameters of the similarity transform, namely A and b, are chosen such that a transformed location $r_t$ is at the center of the local region of digital image 102, a transformed scale $s_t$ is a constant value and a transformed orientation $t_t$ equals zero.

Wavelet generator 130 may generate a set of complex wavelets using at least the dimensions and orientation of the local region of digital image 102. In an embodiment, wavelet generator 130 generates Gabor wavelets. Wavelets are known to those skilled in the art and are functions that resolve data into different frequency components and then analyze each component with a resolution matched to its scale. Although an embodiment of the invention may use Gabor wavelets for computation of a descriptor vector, other wavelet functions with advantages similar to Gabor wavelets may be used for computation of descriptor vectors. Wavelet transformations may be carried out with the help of Gabor wavelets. Each descriptor component value may be generated based on a Gabor wavelet having a particular orientation and spatial frequency. Furthermore, descriptor component values may be magnitudes of an intrinsically complex result of a Gabor transform.

Dot product generator 140 generates a dot product between a local region of digital image 102 and each of the Gabor wavelets that may be generated by wavelet generator 130. In an embodiment, phase information of a complex dot product can be retained by dot product generator 140. Furthermore, a descriptor vector generated by concatenator 150 may be used to compute a value of disparity. Disparity may refer to displacement in a digital image required to obtain an optimal match between local regions of different digital images. Computation of a value of disparity may reduce errors such as, for example, localization errors and may be used in applications such as image stitching. Generation of a value of disparity is described in detail in U.S. Pat. No. 6,580,811.

Concatenator 150 may concatenate the amplitudes of the dot products generated by dot product generator 140 in order to generate a descriptor vector. In an embodiment, use of dot product amplitudes to generate a descriptor vector may overcome effects caused due to errors such as localization errors of regions of interest in digital image 102.

Vector normalizer 160 may normalize the descriptor vector generated by concatenator 150, such that any of its L-norms is constant. A L-norm is known in the art and may be a generalization of an average. The choice of a L-norm is a parameter of the algorithm.

Compressor 170 may compress a descriptor vector by reducing the number of dimensions present in the descriptor vector. In an embodiment, reduction of dimensions in a descriptor vector may be achieved using principal component analysis. Principal component analysis is a technique known to those skilled in the art and may be used to reduce multi dimensional data sets to lower dimensions for analysis.

Figure 2:
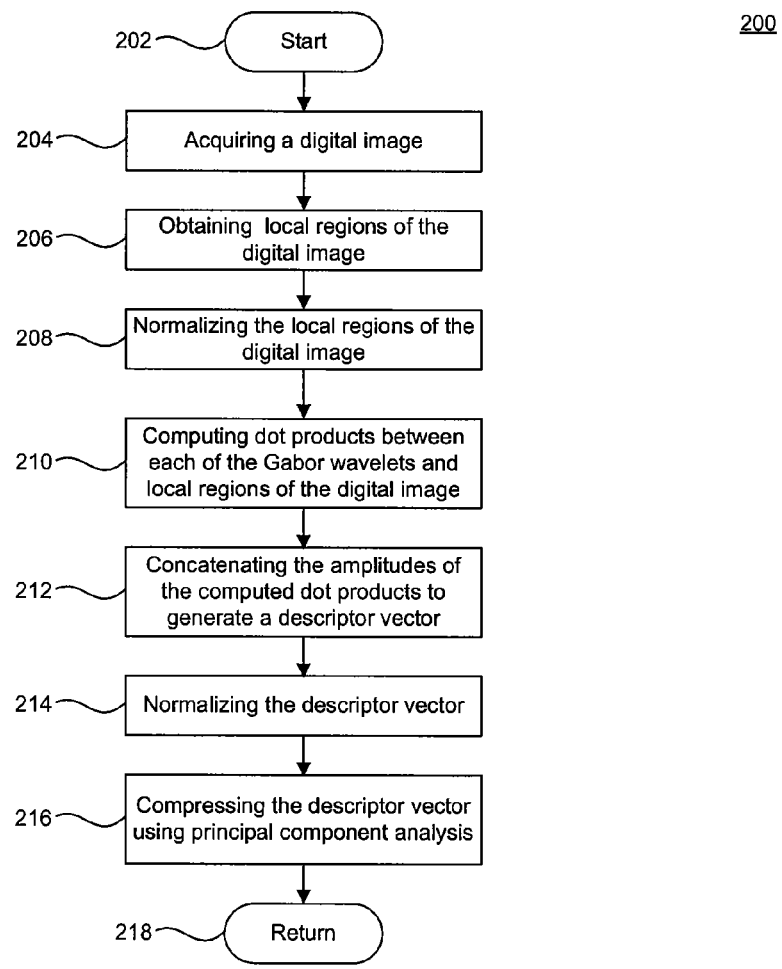
FIG. 2 is a flowchart illustrating various stages involved in computing a descriptor vector according to an embodiment of the invention.
Figure 3:
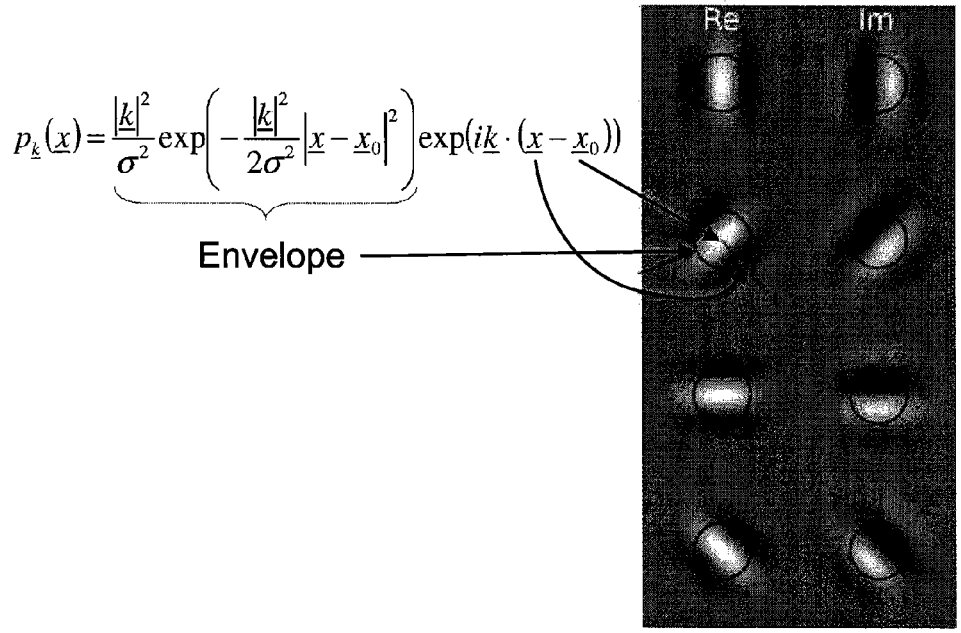
FIG. 3 is a diagram providing a visual representation of Gabor wavelets according to an embodiment of the invention.

FIG. 2 is a flowchart illustrating a method 200 that corresponds to the above process. Method 200 begins at stage 202. A digital image is acquired by an interest point detector (stage 204). The interest point detector then obtains multiple local regions of the acquired digital image (stage 206). A normalizer normalizes the local regions of the acquired digital image (stage 208). A dot product generator then generates a plurality of dot products between each Gabor wavelet that may be generated by wavelet generator 130 and the local regions of the digital image (stage 210). A concatenator then concatenates the amplitudes of the dot products generated by the dot product generator to generate a descriptor vector (stage 212). A normalizer then normalizes the descriptor vector (stage 214). A compressor may then compress the descriptor vector using, for example, principal component analysis (stage 216) and method 200 ends (stage 218).

In this way, system 100 may be used to compute a descriptor vector using Gabor sampling.

II. Gabor Kernels

A Gabor kernel associated with a Gabor wavelet may include a two dimensional complex wave field modulated by a Gaussian envelope. All of the Gabor kernels in a wavelet family may be similar in the sense that they may be generated from a basic kernel by dilation and rotation of the basic kernel.

For each location in digital image 102, a complex value associated with each

Gabor kernel may be generated using convolution. The complex value has an imaginary part and a magnitude as illustrated by FIG. 4.

In an embodiment, a Gabor filter, $\underline{p}_{\underline{k}}(\underline{x})$ can be represented as follows, $$p_{\underline{k}}(x) = \frac{|k|^2}{\sigma^2} \exp\left(-\frac{|k|^2}{2\sigma^2}|x - x_0|^2\right) \exp(ik \cdot (x - x_0))$$

Figure 4:
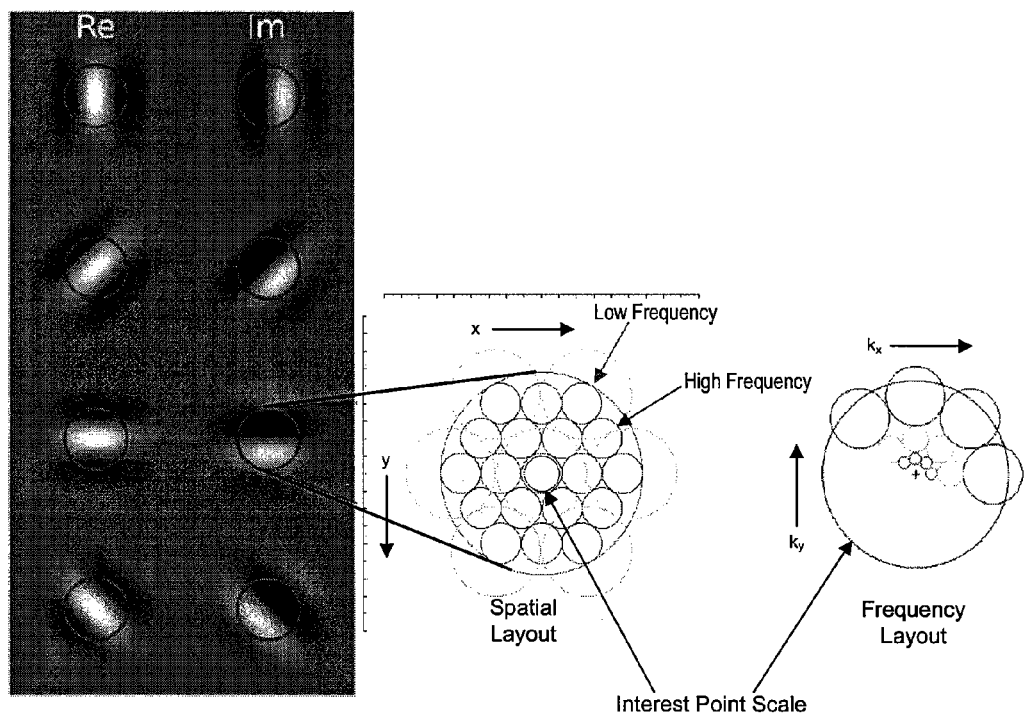
FIG. 4 is a diagram illustrating spatial and frequency layouts of Gabor wavelets according to an embodiment of the invention.

Referring to FIG. 4 and the above equation, the Gabor kernel is centered around $x_0$ and has a wavelength of $2\Pi/|k|$. Additionally, the Gabor kernel has an orientation given by the orientation of k, and is restricted to a Gaussian envelope with width σ.

As stated earlier in the description, similar kernels may be generated from one kernel simply by translation, dilation and rotation.

III. Compressing and Optimizing Gabor Descriptors

In an embodiment, a descriptor vector may be comprised of the responses of complex Gabor wavelets with certain frequencies and orientations convolved with digital image 102 at certain positions in the vicinity of an interest point. The descriptor vector may be generated by combining the amplitudes of individual wavelet responses into a descriptor vector which is then normalized. In an embodiment, the normalization may be L2 normalization. Additionally, the vector may be compressed using principal component analysis (PCA) to reduce dimensionality In an embodiment, dimensionality is reduced by computing an eigen or principal component matrix using a large set of sample vectors obtained from typical image data. The vector to be compressed is then transformed into an eigen space and truncated at a fixed position. This removes degrees of freedom aligned with non-essential principal components. Smaller vectors may be better suited for matching as the complexity and performance of matching algorithms may improve with reduced vector size.

Algorithm parameters may include but are not limited to, (a) a number and locations of Gabor wavelets, (b) a number and spread of frequencies 'k', (c) the number of directions of Gabor wavelets and (d) the size of the Gaussian envelope associated with the wavelets.

In order to optimize a Gabor descriptor, a genetic optimization framework may be used. A genetic optimization framework uses genetic algorithms. A genetic algorithm (GA) is a search technique, known to those skilled in the art, that may be used to find exact or approximate solutions to optimization and search problems.

In an embodiment, a genetic optimization framework may be used to tune the parameters of wavelet generator 130. Such an optimization may optimize a composite score. As an example, this composite score is computed from the number of images recalled by any matching algorithm that searches for images, the number of descriptor vectors participating in the matches and time needed for processing.

Optimization of Gabor descriptors may be carried out on different configurations of Gabor wavelets. Different configurations of Gabor wavelets may vary in the number of frequencies, orientations and positions.

FIG. 4 illustrates a spatial and frequency layout of a configuration of Gabor wavelets that has been optimized by the process described above. Referring to FIG. 5, the outermost circle in the frequency layout represents a frequency corresponding to the interest point scale. x and y represent the spatial co-ordinates. $k_x$ and $k_y$ represent the frequency co-ordinates.

The configuration illustrated in FIG. 4 may be obtained by removing lower frequency kernels to allow configuration that allows for less overlap between the kernels and increases sampling in the frequency and spatial domain. The configuration illustrated in FIG. 4 has Gabor kernels touching at −3 dB points in both the time and frequency domains and may be considered to a compact pattern.

In this way, a compact normalized descriptor vector is generated thorough compression and optimization of the algorithm parameters. A descriptor vector computed using an embodiment of the invention may be used to increase accuracy of an image matching process.

Certain aspects of the present invention include process steps and instructions described herein in the form of an algorithm. It should be noted that the process, steps and instructions of the present invention could be embodied in software, firmware, hardware or any combination thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for computing a descriptor vector:
   (a) identifying a plurality of regions in the digital image;
   (b) normalizing the regions using at least one of a similarity or affine transform to generate normalized regions such that the normalized regions have the same orientation and size as a pre-determined reference region;
   (c) generating one or more wavelets using dimensions of the reference region;
   (d) removing low frequency wavelet kernels from the generated wavelets to reduce overlap between high frequency wavelet kernels and the low frequency wavelet kernels in frequency and spatial domains to generate a final wavelet set;
   (e) generating one or more dot products between each wavelet in the final wavelet set, respectively, and the normalized regions;
   (f) concatenating amplitudes of the one or more dot products to generate a descriptor vector; and (g) outputting a signal corresponding to the descriptor vector.

2. The method of claim 1, further comprising:

(h) normalizing the signal corresponding to the descriptor vector after step (f) and before step (g).

3. The method of claim 1, further comprising:

(i) compressing the signal corresponding to the descriptor vector after step (g).

4. The method of claim 3, wherein said compressing comprises principal component analysis.

5. A computer-based system for computing a descriptor vector for a region in a digital image comprising:

one or more processors;

an interest point detector configured to identify a plurality of regions in a digital image;

a wavelet generator configured to generate one or more wavelets and to remove low frequency wavelet kernels from the generated wavelets to reduce overlap between high frequency wavelet kernels and the low frequency wavelet kernels in frequency and spatial domains to generate a final wavelet set;

a dot product generator configured to generate one or more dot products between each wavelet in the final wavelet set, respectively, and the regions of the digital image; and a concatenator configured to concatenate amplitudes of the one or more dot products to generate a descriptor vector, wherein the interest point detector, the wavelet generator, the dot product generator and the concatenator are implemented on the one or more processors.

6. The system of claim 5, wherein the one or more wavelets comprise at least one Gabor wavelet.

7. The system of claim 5, further comprising a vector normalizer to normalize the descriptor vector.

8. The system of claim 5, wherein the dot product generator is further configured to store phase information of the one or more dot products.

9. A computer-readable storage medium having instructions stored thereon that, when executed by a processing device, cause the processing device to perform operations comprising:

identify-identifying a plurality of regions in a digital image;

normalizing the regions using at least one of a similarity or affine transform such that the normalized regions have the same orientation and size as a pre-determined reference region;

generating one or more wavelets using dimensions of the reference region, the generating of the wavelets configured to reduce overlap between wavelet kernels in frequency and spatial domains;

removing low frequency wavelet kernels from the generated wavelets to reduce overlap between high frequency wavelet kernels and the low frequency wavelet kernels in frequency and spatial domains to generate a final wavelet set;

generating one or more dot products between each wavelet in the final wavelet set, respectively, and the normalized regions-region;

concatenating amplitudes of the one or more dot products to generate a descriptor vector; and outputting a signal corresponding to the descriptor vector.

10. The computer-readable storage medium of claim 9, the operations further comprising: normalizing the signal corresponding to the descriptor vector prior to the outputting.

11. The computer-readable storage medium of claim 9, the operations further comprising, compressing the signal corresponding to the descriptor vector after the outputting.

\* \* \* \* \*

UNITED STATES PATENT AND TRADEMARK OFFICE
CERTIFICATE OF CORRECTION

PATENT NO. : 8,098,938 B1  
APPLICATION NO. : 12/049841  
DATED : January 17, 2012  
INVENTOR(S) : Buddemeier et al.

It is certified that error appears in the above-identified patent and that said Letters Patent is hereby corrected as shown below:

Column 8
Line 8, Claim 9, replace "identify-identifying a plurality" with --identifying a plurality--.

Column 8
Lines 24-25, Claim 9, replace "the normalized regions-region" with --the normalized regions--.

Signed and Sealed this
Seventh Day of August, 2012

David J. Kappos
*Director of the United States Patent and Trademark Office*